United States Patent [19]

Hwang et al.

[11] Patent Number: 5,425,108
[45] Date of Patent: Jun. 13, 1995

[54] MOBILE TYPE OF AUTOMATIC IDENTIFICATION SYSTEM FOR A CAR PLATE

[75] Inventors: Chung-Mu Hwang, Taipei; Wen-Yu Chen, Hualian; Shyh-Yeong Shu, Junglih, all of Taiwan, Prov. of China

[73] Assignee: Industrial Technology Research Institute, Hsinchu, Taiwan, Prov. of China

[21] Appl. No.: 124,445

[22] Filed: Sep. 22, 1993

Related U.S. Application Data

[63] Continuation-in-part of Ser. No. 940,684, Sep. 4, 1992, abandoned.

[51] Int. Cl.$^6$ ............... G06K 9/00; G06K 9/34
[52] U.S. Cl. ................... 382/105; 382/173; 382/159
[58] Field of Search ............. 382/1, 14, 15, 9, 28, 382/48, 39; 340/932.2, 933, 937; 395/21, 61

[56] References Cited

U.S. PATENT DOCUMENTS

| | | | |
|---|---|---|---|
| 4,368,979 | 1/1983 | Ruell | 382/1 |
| 4,878,248 | 10/1989 | Shyu et al. | 382/10 |
| 5,081,685 | 1/1992 | Jones, III et al. | 382/1 |
| 5,105,468 | 4/1992 | Guyon et al. | 382/14 |
| 5,127,063 | 6/1992 | Nishiya et al. | 382/8 |
| 5,136,658 | 8/1992 | Mori | 382/9 |
| 5,168,549 | 12/1992 | Takagi et al. | 395/21 |

OTHER PUBLICATIONS

Krishnapuram et al. "Fuzzy Set Theoretic Approach to Computer Vision: An Overview" IEEE Int. Conf. on Fuzzy Systems, Mar. 1992, pp. 135–142.

Pal, "Fuzzy Sets in Image Processing and Recognition" IEEE Int. Conf. on Fuzzy Systems, Mar. 1992, pp. 119–126.

Dia et al. "Automatic Recognition of Province name on the license plate of a moving vehicle." 9th Int. Conf. on Patt. Rec. Nov. 1988.

Ishibuchi et al. "Pattern Classification by Distributed Representation of Fuzzy Rules" IEEE Int. Conf. on Fuzzy Systems Mar. 1992.

Oug et al. "Space-variant Optical Character Recognition." 11th IAPR Int. Conf. on Pattern Recognition. Aug. 1992.

*Primary Examiner*—Michael T. Razavi
*Assistant Examiner*—Jon Chang
*Attorney, Agent, or Firm*—W. Wayne Liauh

[57] ABSTRACT

An automatic identification system for a car-plate which comprises a photographing apparatus and an image-processing CPU. The system disclosed in the present invention can be mounted in a car for automatically identifying a car-plate that is under a still or moving condition. The photographing apparatus is used for taking the image of a car-plate, and the image is then transmitted into the image-processing CPU, which accurately extracts the characters of a car-plate using a "Fuzzy inference" technique, and identifies the characters through a character structure analysis neural network. With the automatic identification system of the present invention, an incorrect identification can be avoided in the event the image of a car-plate is blurred, and the characters is deformed or smeared.

6 Claims, 9 Drawing Sheets

(rule 1)

if x is large and dx is small then boundary is large (rule 2)

if x is small and dx is large
then boundary is small (rule 3)

if x is large
and dx is large then boundary is middle (rule 4)

if x is small
and dx is small then boundary is middle

MOBILE TYPE OF AUTOMATIC IDENTIFICATION SYSTEM FOR A CAR PLATE

This is a continuation-in-part of application Ser. No. 07/940,684, filed Sep. 4, 1992, now abandoned.

BACKGROUND OF THE INVENTION

At the present time, all car-plate identification systems are fixed types which are installed at fixed spots. All of these systems are provided with a sensing unit to detect a car that passed thereby. The sensing unit will trigger a photographing apparatus to identify a car-plate. Such a fixed type car-plate identification system has to be installed at a suitable spot and requires a considerable constuction work after it is set up, such system can only conduct a sensing operation and a photographing operation at a given angle over a limited area. It cannot perform a mobile identification operation of a car-plate to be placed on a car under moving condition so as to detect a stolen or otherwise wanted car. In other words, it has no mobility. Such type of identification system comprises several photo-sensitive detectors to detect a car passing a given spot, and to send a photographing instruction to allow a camera take a car-plate image, which is transmitted into an image-processing unit to find the position of a car-plate by means of a differential space frequency (i.e. intensity) analysis method. The outer frame of a car-plate is to be defined by means of a projection method, and then each character of a car-plate is extracted by means of a differential limiting-value analysis method; each character of a car-plate is then identified by means of a gray-scale three code method or an template-matching method.

In the aforesaid prior art, a projection method is used for extracting the characters of a car-plate. In case of a car-plate being a smaller one or being smeared, a wrong character extraction might occur, causing a wrong identification. Moreover, the prior art is unable to identify the characters of a car-plate in the event of the character being deformed or smeared.

SUMMARY OF THE INVENTION

In view of the drawbacks of the prior art, the inventor has developed an identification system for a car-plate, of which the primary object is to provide a system to identify a car-plate in a mobile manner. The aforesaid identification system can be installed in a police car, in still or moving condition, to automatically identify a car-plate so as to facilitate detecting a stolen or otherwise wanted car. Therefore the system is considered far superior to the previous fixed type of car-plate identification system.

Another object of the present invention is to provide a highly efficient identification system for a car-plate by using a "Fuzzy inference" and a "Character structure analysis neural network" for extracting the characters of a car-plate and identifying the car-plate accurately. The present invention can improve the drawbacks of the prior art such as being unable to identify a car-plate which has a smeared frame, or deformed characters.

DETAILED DESCRIPTION

Figure 1:
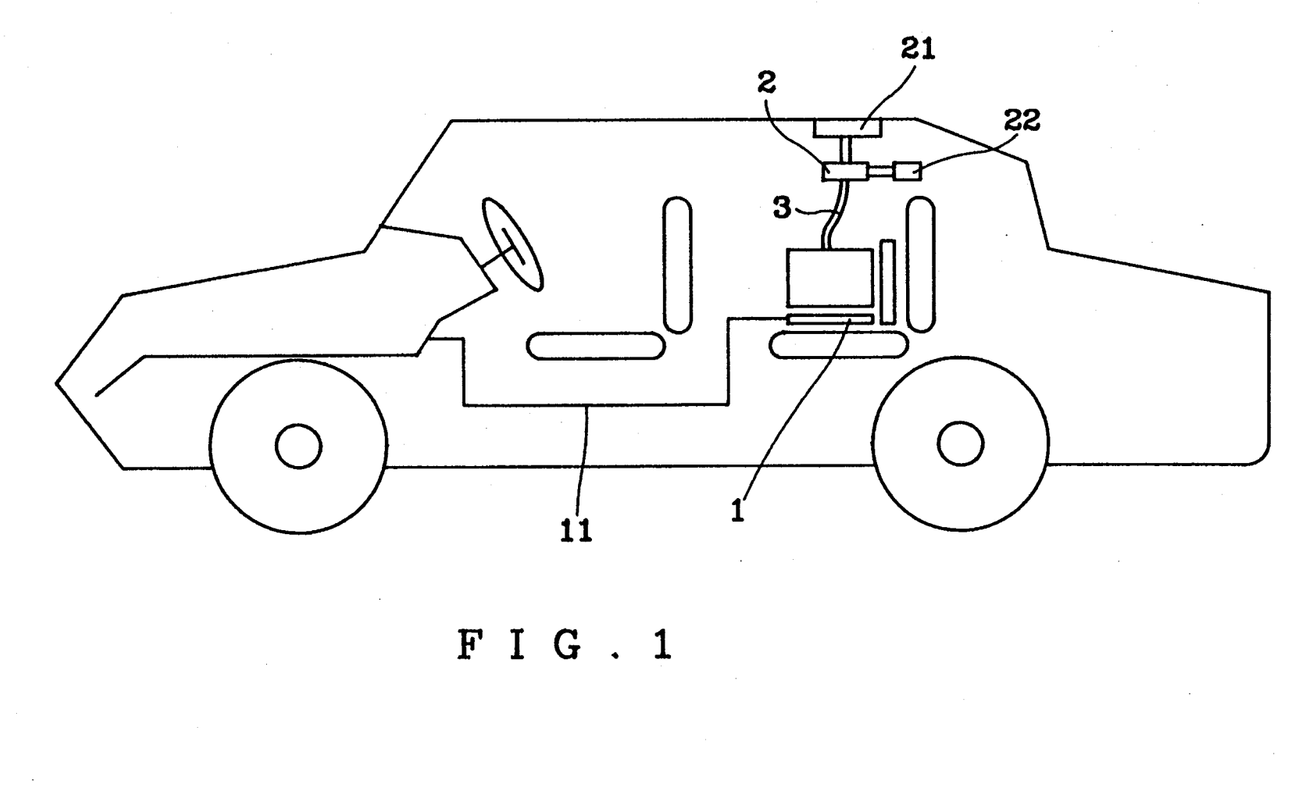
FIG. 1 is a set-up view of the present invention in a car.

Referring to FIG. 1, the identification system according to the present invention is installed in a car; a photographing apparatus 2 is set up in the car with a camera holder 21; the lens 22 of the photographing apparatus 2 is aiming at a visual field (i.e., a visual field, in which a car is likely to appear) so as to photograph. A signal transmission wire 3 is connected between the apparatus 2 and an image-processing CPU 1, whereby the steps of finding a car-plate location, extracting the characters of a car-plate, and identifying the characters of a car-plate (English letters or Arabic numerals) can be done. Before further using the aforesaid data, the car plate number identified may be used for vehicle monitor and management, and for cross-reference by putting in a stolen or otherwise wanted car file to help investigations of the case related thereto.

In FIG. 1, the camera holder 21 can be a detachable universal joint type of fixture, such as a coupling member with an excellent shock-proof means; it can be set at any desired angle. The photographing apparatus 2 includes a high resolution CCD electronic camera having a shutter speed of 1/10000 sec. and a zoom lens 22. The image-processing CPU 1 includes a 6-inch LCD and a data-input terminal, etc.

Figure 2:
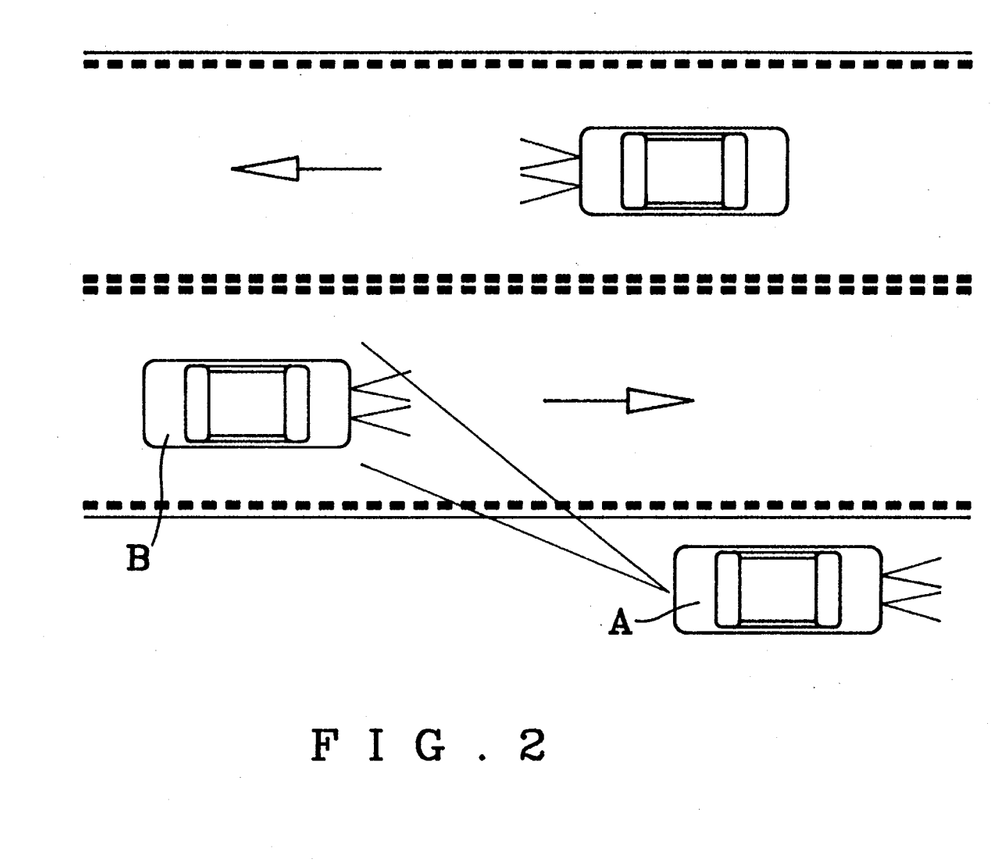
FIG. 2 illustrates the present invention being used for car-plate identification.

FIG. 2 illustrates the system according to the present invention as operated on a road side to identify a car-plate. The car "A" stands for a detecting car equipped with a mobile type of automobile identification system according to the present invention. The car "B" stands for a car whose identification is to be detected on a road. The detecting car "A" can also detect car "B" both under running condition (good detection result can be obtained when the car speed is under 120 KM/hr.) within a range from 2-15 meters, the car "A" can detect the identification of car "B" under still or moving condition. The identification system can operate by using the car power supply through power supply wire 11. In other words, the identification system does not require external power supply whether operating under moving or still condition. If the identification system is furnished with a separate power supply, the system according to the present invention can be used as a portable identification system.

Figure 3:
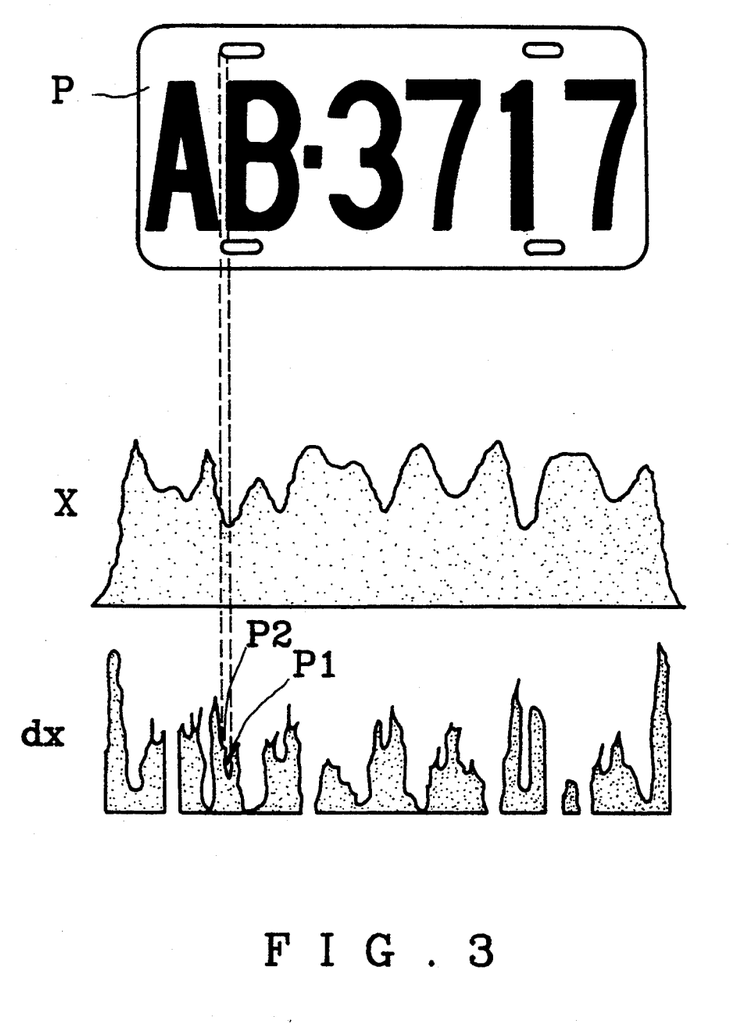
FIG. 3 illustrates the difference between the conventional projection method and the method used in the present invention to frame a character for subsequent identification.
Figure 10:
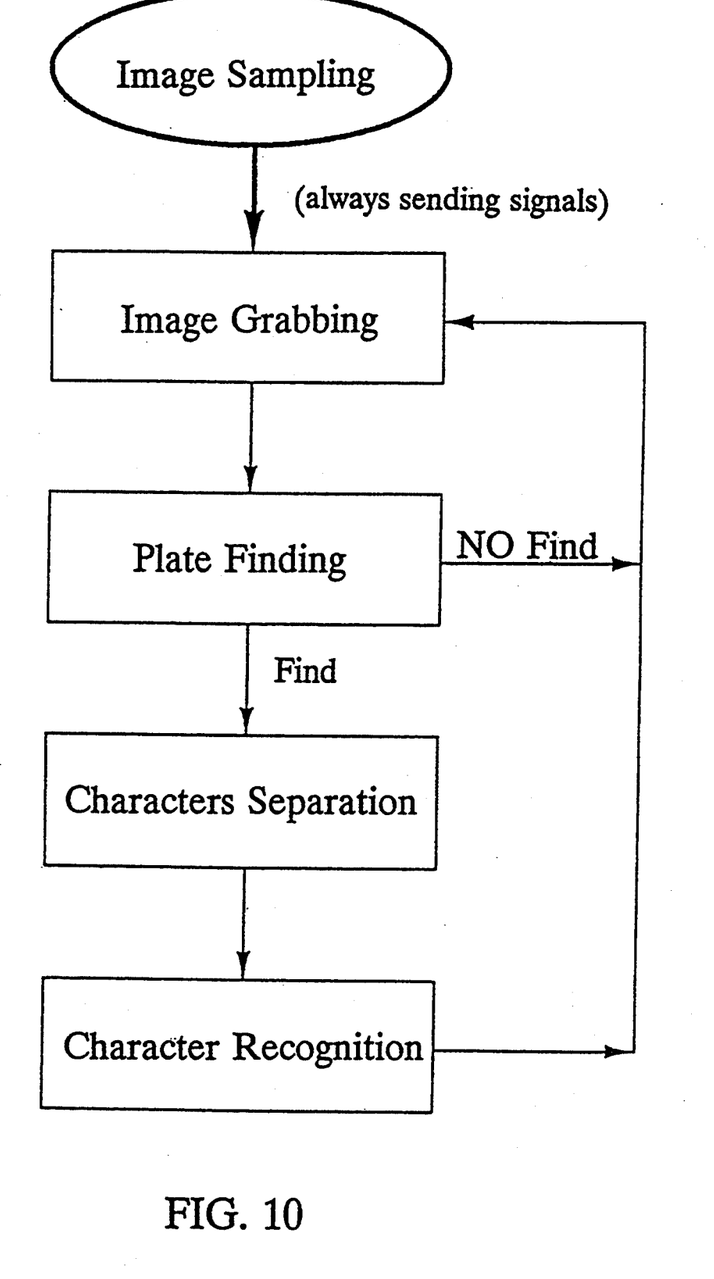
FIG. 10 is a flowchart diagram showing the four major steps of the method disclosed in the present invention.

In the present invention, a "Fuzzy inference" is used for extracting the characters of a car-plate so as to solve the defects of the conventional projection method. FIG. 3 illustrates the difference between the conventional projection method and the method used in the present invention to frame a character from the car-plate. According to the conventional projection method, a character of a car-plate P is to be extracted by using a dividing point P1 as shown in FIG. 3, which is a wave trough point in a first differential vertically projected image of the partial area image of a car-plate P; such a method would cause a blurred area among the characters of a car-plate image as a result of a blurred car-plate, and therefore, the dividing point is usually an incorrect one. According to the present invention, a fuzzy inference is used to obtain the best dividing point P2 and extract a character. The method according to the present invention is described in detail as follows:

In the method disclosed in the present invention, a photographing apparatus is provided to take a picture or pictures of a car-plate while under a still or moving condition. The picture is sent to an image-processing CPU, which first converts the analog picture into a digital image comprising a plurality of pixels arranged in a plurality of columns by a plurality of rows, each pixel is represented by a gray level, typically from 0 to 255. The image-processing CPU then performs an automatic identification (i.e., recognition) of characters contained in the car-plate FIG. 10 is a flowchart diagram illustrating the four major steps in the present invention, the first step involves converting an analog image into a digital image, the second step involves finding the location of the license plate, the third step involves separating individual characters, and the four step involves recognition of each individual character.

The second step in the character recognition process is to find the position of the car-plate in the digital image. Then a partial area image corresponding to the car-plate is extracted. The identification and extraction of the car-plate can be done using one or several methods known in the art.

After the partial area image corresponding to the car-plate is extracted, a vertically projected picture "X" corresponding to the partial area image of the car-plate is calculated. The projected picture X is a one-dimensional array (i.e., $X=[X_1, X_2, X_3, \ldots X_i]$) obtained by summing all the gray levels of the pixels in the same column. Then a first difference process is performed on the partial area image of the car-plate and the values of calculated differences in each column area similarly added to form a first differential vertically projected array dx. The first difference process is performed by subtracting from the gray level of each pixel by the gray level of a neighboring pixel in the next column but of the same row and taking the absolute value of the difference between the two neighboring pixels. The first differential vertically projected array dx is also a one-dimensional array (i.e., $dx=[dx_1, dx_2, dx_3, \ldots dx_i]$). And as discussed above, dx is used in the prior art method to identify the best dividing points by selecting those points that correspond to the minimum values of dx (troughs). In the present invention, instead of using dx directly as in the prior art, the two arrays of X and dx discribed above are used to establish a "fuzzy rule base", from which a "membership function" is determined. A "membership function", in the present case, is defined as the "boundary" between two characters. In the application of fuzzy theory, the term "boundary" roughly means the probability of a point being found to be a boundary dividing two characters. An example of the fuzzy rule base developed in the present invention consists of the following four rules (in the following rules, X means $X_i$, and dx means $dx_i$):

Rule 1: if (Xi is large) and (dxi is small) then (boundary is large).
Rule 2: if (Xi is small) and (dxi is large) then (boundary is small).
Rule 3: if (Xi is large) and (dxi is large) then (boundary is middle).
Rule 4: if (Xi is small) and (dxi is small) then (boundary is middle).

Note:
(Xi is large) means the X[i] value being large.
(dxi is small) means the dx[9] value being small.
(boundary is large) means the point "i" being very possible to be a boundary.

Figure 4:
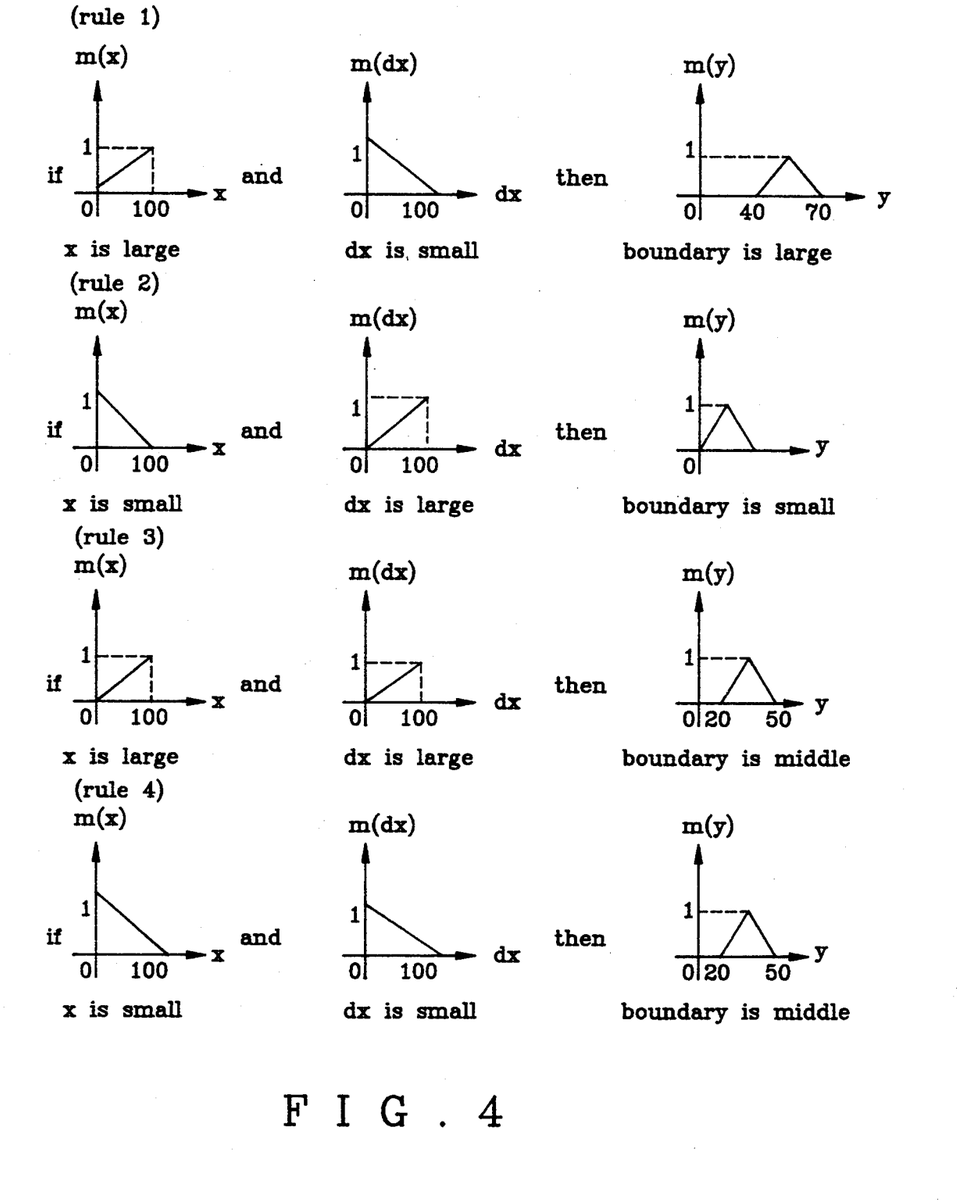
FIG. 4 illustrates a "Fuzzy Rule Base" being established in the present invention.

FIG. 4 illustrates an example of how the four fuzzy rules, which comprise the fuzzy rule base of the present invention, are defined. In the fuzzy theory, the expression that "X is large" (i.e., "$X_i$ is large") is defined, in a preferred embodiment of the present invention, as a monotonically increasing linear function between the normalized "probability" value (from 0 to 1) and the normalized value of X (from 0 to 100). Such a monotonically increasing function for X indicates that the probability of X being large (e.g., 100) is very high (e.g., 1); whereas, the probability of X being small (e.g., 0) is very small (e.g., 0). Likewise, the expression that "dx is small" (i.e., $dx_i$ is small) is similarly defined as a monotonically decreasing linear function between the normalized "probability" (from 0 to 1) and the normalized value of dx (from 0 to 100). The expression that "boundary is large" is defined, differently from both X and dx, as a triangle having an apex at about 55 (between the values of two bases 40 and 70). The statement that "boundary is middle" means that the probability of a point being a boundary is neither large nor small, but is in the "middle" (i.e., the probability is "intermediate"). The above expressions of X, dx, and "boundary" are arbitrary and can be adjusted based on the experience of the operator or programmer (i.e., it is strongly related to artificial intelligence).

Figure 5:
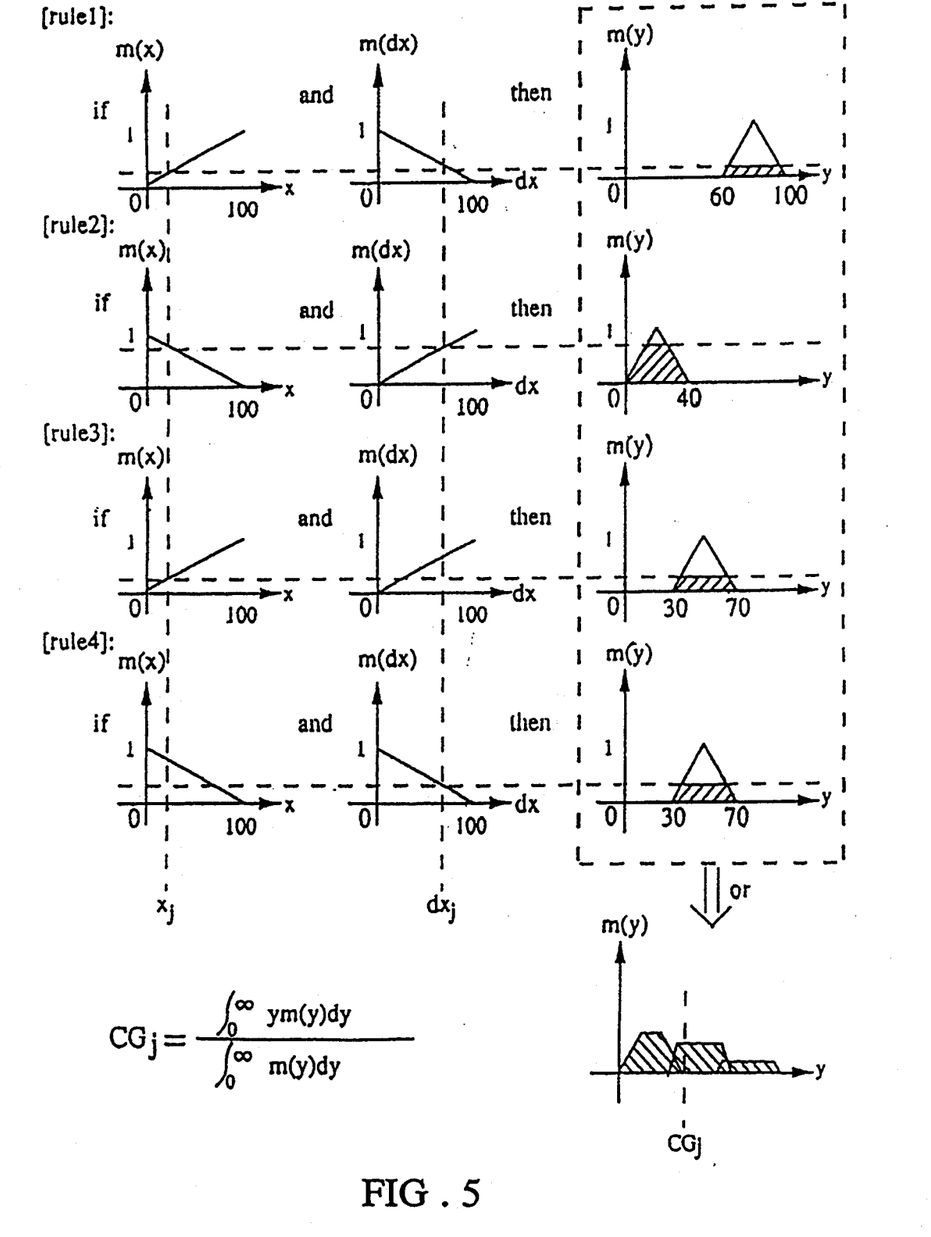
FIG. 5 illustrates an example of how the "Fuzzy Rule Base" as shown in FIG. 4 is used to derive the fuzzy reference.

The fuzzy rule base is used to find the most likely dividing points between characters using a Max—Min inference procedure. In deciding the best dividing points to frame a character in a car-plate, a point is first selected which has an X value greater than a threshold value. Six points are then selected, three from the right and three more from the left side of this selected point. Seven points are thus selected for a character, P1, P2, P3, P4, P5, P6, and P7. Each of the seven points is then subject to a Max—Min inference. FIG. 5 illustrates such a Max—Min inference procedure. First, the values of Xj and dxj are obtained for point Pj, then their respective "probability values" are calculated from each of the four rules described in FIG. 4. The minimum (i.e., the "and" operation) of the two probability values from each rule is used to obtain the membership function, which is the probability of Pj being a boundary, according to each rule. The value of the calculated "boundary" is expressed as the shaded area in the membership function curve. Finally, the value of all the values of "boundaries" are summed up (according to the "maximum" portion, or, the "or" portion, of the Max-Min inference) to obtain the final inference value, CGPj. Typically, the value of CGPj is normalized, i.e., $$CGj = \frac{\int_0^\infty ym(y)dy}{\int_0^\infty m(y)dy}$$

The dividing point is selected as the point which corresponds the maximum CGPj of the seven inference values, i.e., CGP1, CGP2, ..., CGP7.

After the aforesaid dividing step to a character according to the "Fuzzy inference", identification to the character divided must be done. According to the present invention, a character is identified by means of a character structure analysis neural network. After the characters divided being assembled, each of them may be a numeral or an English letter; some parts of the characters are similar to each other. According to the conventional identification method, such similar parts of the characters would become confused or fuzzy; for example, the numerals "3" and "5", "2" and "7", or the letters "D" and "O", "O" and "Q", "R" and "B", "O" and "U", "C" and "G" are susceptible of becoming fuzzy. In order to overcome the problem of mis-identifying the aforesaid characters, a "character structure analysis neural network" is used in the present invention. In real identification operation, the identification ratio according to the present invention can be up to 98%, which is far superior to the conventional three-code method or template-matching method. In addition the identification method according to the present invention has a higher adaptability to a deformed or blurred character.

Figure 6A:
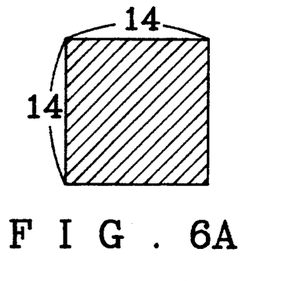
FIG. 6A, 6B and 6C illustrates a full shape, a upper shape and a lower shape of a character image respectively.
Figure 6B:
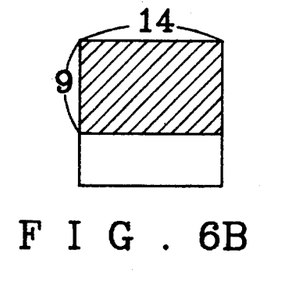
Figure 6C:
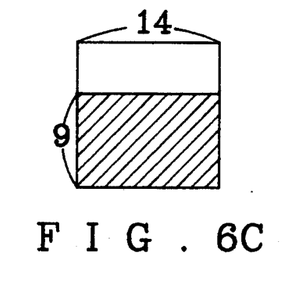

According to the identification method of the present invention, a character (including 14×14 pixels) to be identified is to be divided into three parts, i.e., a full shape, a top shape and a bottom shape as shown in FIGS. 6A, 6B and 6C; the full shape has 14×14 pixels, the top shape has 9×14 pixels, and the bottom shape has 9×14 pixels; in other words, the method of the present invention has considered the whole shape of a character to be identified, and the detailed parts, thereof, too so as to obtain an accurate result.

One of the advantages of the present invention is that it identifies a character based on the full shape, the top shape, and the bottom shape of the character. The three shapes of the character to be identified are connected via a neural network as shown in FIG. 7.

Figure 7:
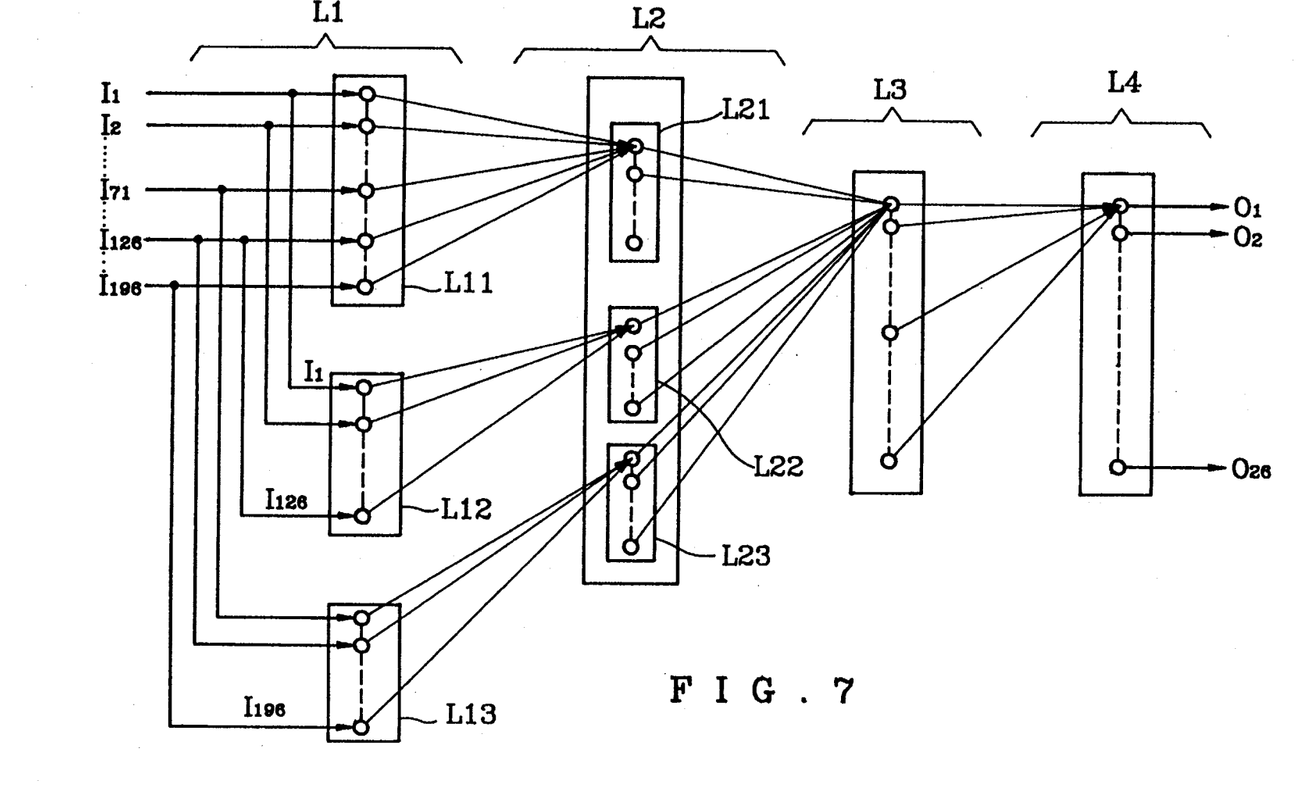
FIG. 7 is a diagram showing a character structure analysis neural network according to the present invention.

FIG. 7 illustrates a four layer neural network, including an input layer L1, a character structure layer L2, an implicit layer L3 and an output layer L4. FIG. 7 shows merely the connection among the neural elements of the layers. The input layer L1 includes a full shape L11, a top shape L12 and a bottom shape L13. The character structure layer L2 includes three groups, i.e., a full shape group L2, a top shape group L23 and a bottom shape group L23. The neural chains are connected to one another in a method as follows:

(1). The input layer L1 and the character structure layer L2 are connected partially.

(2). Each of the neural elements of the full shape group L21 in the character structure layer L2 are connected with all the neural elements (i.e., all the 196 elements of the input data) in the full shape L11 of input layer L1.

(3). Each of the neural elements of the top shape group L22 in the character structure layer L2 are connected with all the neural elements (i.e., the first 126 elements of the input data) in the top shape L12 of input layer L1.

(4). Each of the neural elements of the bottom shape group L23 in the character structure layer L2 are connected with all the neural elements (i.e., the last 126 elements of the input data) in the bottom shape L13 of input layer L1.

(5). The neural chains between the character structure layer L2 and the implicit layer L3 are fully connected.

(6). The neural chains between the implicit layer L3 and the output layer L4 are fully connected.

Once the four-layered neural network is established, the set of equations can be solved using standard procedures. A preferred embodiment is to use a back propagation semi-linear activation function, which is illustrated in FIGS. 8 and 9.

Figure 8:
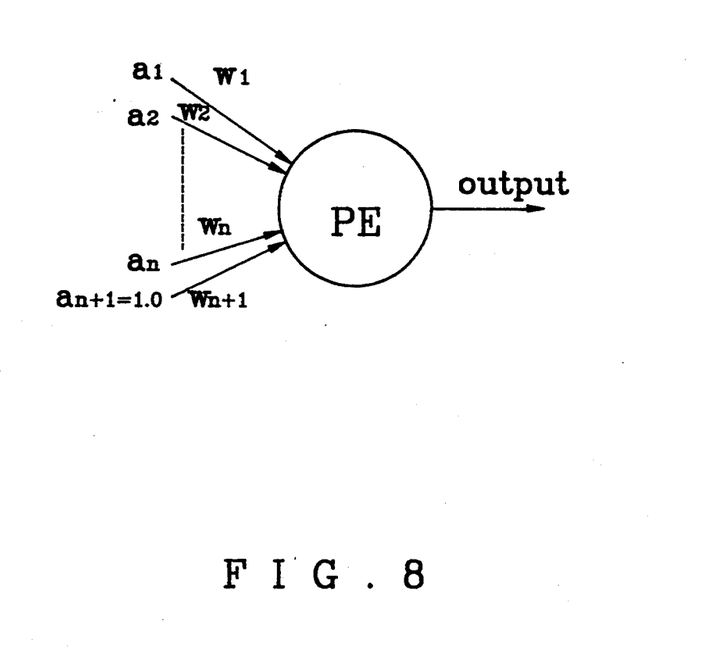
FIG. 8 is a diagram showing the input and output modes of a neural element.
Figure 9:
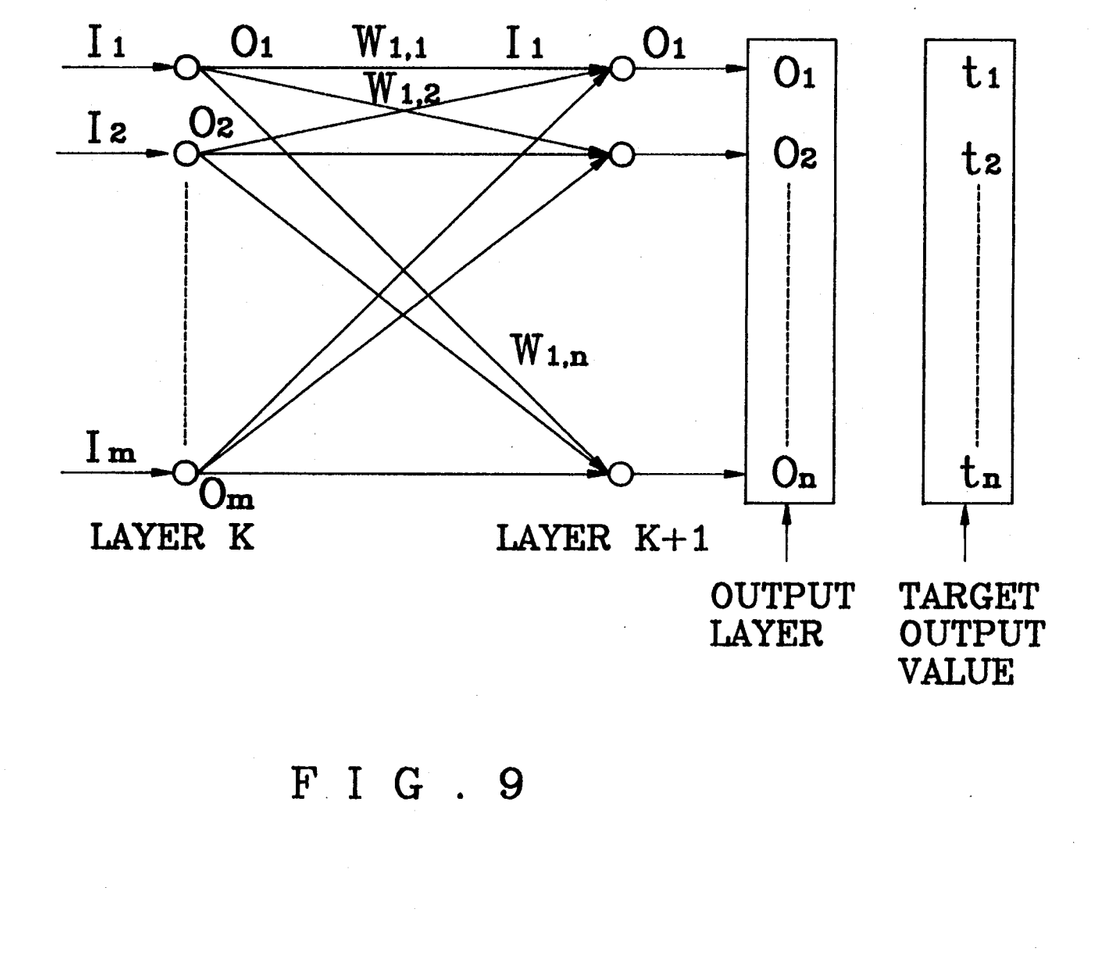
FIG. 9 illustrates the adjustment of the neural chain in the present invention.

Referring to FIGS. 8 and 9, the input of a given neural element PE includes a1, a2, a3 ... an, an+1; wherein the an+1=1.0;

$$\text{Sum} = \sum_{i=1}^{n+1} ai\ wi$$

$$\text{Output} = \frac{1}{1 + e^{-Sum}}$$

Method of neural chain adjustment:

$$W(j+1) = W(j) + \Delta W$$

$$\Delta W = \eta \delta i$$

Output layer: $\delta = (t-0)0(1-0)$

Non-output layer: $\delta = 0(1-0)\Sigma(\eta W)$, in which the value of $\eta$ is ranging from 0.1–0.8; 0.2 is found to produce better result.

We claim:

1. An automatic identification method for a cap-plate comprising a photographing apparatus adapted to take a picture of the car-plate while under still or moving condition, an image-processing CPU, and means for transmitting said picture into said image-processing CPU for converting said picture into a digital image comprising a plurality of pixels arranged in a plurality of columns by a plurality of rows, each pixel being represented by a gray level, and for automatic identification of characters contained in said car-plate; wherein said automatic identification of characters performed by said image-processing CPU comprises the steps of:

(a) finding the position of the car-plate in said image and extracting a partial image corresponding to said car-plate using an appropriate methodology;

(b) calculating a vertically projected array of said partial image containing said car-plate by summing the gray levels of all the pixels in a same column, and storing the result so calculated into a one-dimensional array X;

(c) calculating a first differential vertically projected array dx by performing a first difference process of said partial image containing said car plate as obtained in step (a) and summing values of calculated differences in each column to form said array dx, said first difference process is formed by subtracting from the gray level of each pixel thereof by the gray level of a neighboring pixel in the next column but on the same row and taking the absolute value of the difference;

(d) establishing a fuzzy rule base by forming a membership function which is a function of X and dx obtained in steps (b) and (c) above;

(e) using a max-min inference procedure in accordance with said fuzzy rule base to select a plurality of best dividing points to thereby frame and extract every individual character contained in said car-plate;

(f) converting each extracted character into a plurality of pixels, which are then grouped into three pixel groups: a full shape group, a top shape group and a bottom shape group, wherein said full shape group contains all the pixels corresponding to said extracted character, and said top shape and bottom shape groups each containing only a portion of said pixels;

(g) forming a four-layer neural network containing four layers: an input layer, a character structure layer, an implicit layer, and an output layer, said input layer containing portions corresponding to said full shape group, said top shape group and said bottom shape group obtained in step (f); and (h) using said neural network from step (g) to identify all said characters extracted in step (e).

2. The automatic identification method for a car-plate of claim 1 wherein said fuzzy rule base consists of the following rules:

(a) for a point $P_p$ when X is j is large and $dx_j$ is small, then said membership function, which corresponds to the probability of said point $P_j$ being a boundary, is large;

(b) when $X_j$ is small and $dx_j$ is large, then said membership function is small;

(c) when $X_j$ is large and $dx_j$ is large, then said membership function is middle; and (d) when $X_j$ is small and $dx_j$ is small, then said membership function is middle.

3. The automatic identification method for a car-plate of claim 2 wherein:

(a) said expression "$X_j$ is large" is represented by a monotonically increasing linear function, and said expression "$X_j$ is small" is represented by a monotonically decreasing linear function;

(b) said expression "$dx_j$ is large" is represented by a monotonically increasing linear function, and said expression "$dx_j$ is small" is represented by a monotonically decreasing linear function;

(c) said membership function is represented by a triangular function.

4. The automatic identification method for a car-plate as claimed in claim 1; wherein:

said character structure layer of said neural network includes three portions: a full shape portion, a top shape portion and a bottom shape portion;

said input layer and said character structure layer being partially connected in such a manner that every neural element in said full shape portion of said character structure layer is connected with all neural elements in said full shape portion of said input layer, every neural element in said top shape portion of said character structure layer is connected with all neural elements in said top shape portion of said input layer, and every neural element in said bottom shape portion of said character structure layer is connected with all neural elements in said bottom shape portion of said input layer;

said character structure layer and said implicit layer fully connected with neural chains; and said implicit layer and said output layer are fully connected with neural chains.

5. The automatic identification method for a car-plate as claimed in claim 1 which is adapted to be installed and operable in a mobile car.

6. The automatic identification method for a car-plate as claimed in claim 5 wherein said image-processing CPU and said photographing apparatus are powered by a power supply provided in said mobile car.

* * * * *